United States Patent
Lazutkin et al.

(10) Patent No.: US 12,212,665 B1
(45) Date of Patent: Jan. 28, 2025

(54) SYSTEMS AND METHODS FOR TRANSFERRING SECRET DATA VIA AN UNTRUSTED INTERMEDIARY DEVICE

(71) Applicant: Tangem AG, Zug (CH)

(72) Inventors: Andrey Lazutkin, Dubai (AE); Denis Volokitin, Yerevan (AM)

(73) Assignee: Tangem AG, Zug (CH)

( * ) Notice: Subject to any disclaimer, the term of this patent is extended or adjusted under 35 U.S.C. 154(b) by 4 days.

(21) Appl. No.: 18/464,461

(22) Filed: Sep. 11, 2023

(51) Int. Cl.
| | | |
|---|---|---|
| H04L 29/06 | (2006.01) | |
| G06Q 20/32 | (2012.01) | |
| G06Q 20/34 | (2012.01) | |
| G06Q 20/36 | (2012.01) | |
| H04L 9/08 | (2006.01) | |
| H04L 9/32 | (2006.01) | |

(52) U.S. Cl.
CPC ......... *H04L 9/0825* (2013.01); *G06Q 20/321* (2020.05); *G06Q 20/341* (2013.01); *G06Q 20/36* (2013.01); *H04L 9/3247* (2013.01); *H04L 9/3263* (2013.01)

(58) Field of Classification Search
CPC ... H04L 9/0825; H04L 9/3247; H04L 9/3263; H04L 63/12; H04L 9/006; H04L 9/0813; H04L 9/32; H04L 29/06755; H04L 29/08621; H04L 63/08; H04L 63/0823; H04L 63/0853; H04L 63/0884; H04L 2463/082; G06Q 20/321; G06Q 20/341; G06Q 20/36; G06Q 20/3674; G06Q 20/409; H04H 60/23; H04N 2201/3233; H04N 21/25833; H04N 2201/3235; H04N 2201/3236; H04N 2201/3239; H04W 12/00; H04W 12/06; G05B 2219/25423; G05B 2219/32038; G07B 2017/0087; G07B 2017/00895; G06F 21/30; G06F 21/44
See application file for complete search history.

(56) References Cited

U.S. PATENT DOCUMENTS

| | | | |
|---|---|---|---|
| 2019/0052464 A1* | 2/2019 | Doliwa | H04L 9/3213 |
| 2022/0294610 A1* | 9/2022 | Sabbu | H04L 9/0825 |

* cited by examiner

*Primary Examiner* — Joseph P Hirl
*Assistant Examiner* — Leynna Truvan
(74) *Attorney, Agent, or Firm* — ArentFox Schiff LLP; Michael Fainberg (57) ABSTRACT

Techniques described herein relate to a method for transmitting secret information to a trusted device via an untrusted intermediary device, the method comprising: establishing, by a primary authentication device, a connection with a secondary authentication device via an untrusted intermediary device; receiving, from the secondary authentication device, a secondary public transfer key, a secondary public device key, a secondary attestation signature, and a secondary certificate; in response to verifying that the secondary certificate confirms the secondary public device key and that the secondary attestation signature confirms the primary public transfer key and the secondary public transfer key, calculating a transfer key unique to a transfer of the secret information; encrypting the secret information with the transfer key; and transmitting, to the secondary authentication device via the untrusted intermediary device, the encrypted secret information, wherein the secondary authentication device is configured to decrypt the encrypted secret information.

18 Claims, 6 Drawing Sheets

Fig. 6 ized device and encrypted secret information, wherein the secondary authentication device is configured to decrypt the encrypted secret information.

SYSTEMS AND METHODS FOR TRANSFERRING SECRET DATA VIA AN UNTRUSTED INTERMEDIARY DEVICE

FIELD OF TECHNOLOGY

The present disclosure relates to the field of data security, and, more specifically, to systems and methods for transferring secret data stored on a trusted storage device to other trusted storage devices via untrusted intermediary device(s).

BACKGROUND

Personal cryptographic key management devices (e.g., a hardware wallets, "cold" wallets, self-custody wallets, self-storage wallets, etc.) built into integrated circuit cards (ICCs) or wearable-based payment devices (e.g., a smart watch) can be used to authorize transactions in payment systems requiring direct consent for operations from the holder of funds (e.g., blockchains, central bank digital currencies (CBDCs), distributed ledger technologies (DLTs)).

In some cases, a smartcard may serve as a personal hardware wallet for blockchain assets and, simultaneously, enable payment at a point-of-sale (POS) terminal with the stored assets. For example, a smartcard may transmit an authorization using a standard single-tap contactless approach or an insert-your-card contact approach made with a chip and PIN bank card. This makes such smartcards incredibly useful and versatile.

However, there is a chance that a user may lose his/her smartcard at one point or another, and thus lose his/her wallet built into the smartcard. As an example, because of the high security measures associated with maintaining blockchains, there is a possibility that the user may even lose access to his/her assets altogether when losing his/her private key. To prevent this possibility, in the crypto industry, when a user creates a wallet, the user is provided a seed phrase (e.g., a BIP39 mnemonic phrase). One of many downsides of using the seed phrase is that knowledge of the English language may be required to copy the phrase. Typically, the seed phrase is a 12 or 24 word phrase that can be used to restore the private key of the wallet. Unfortunately, a seed phrase is highly insecure. Because it is usually stored on paper or on a screenshot, it can be easily copied. Anyone who has a copy of a given seed phrase can manage assets in the wallet associated with the seed phrase. In fact, an authorized user may not even know how many copies of a seed phrase exist, which makes seed phrases a great target for intruders and opens attack types such as social engineering, manipulation, etc. Thus, when activating a wallet with a seed phrase, users need to ensure that no one else has access to the seed phrase.

Therefore, there exists a need for way to provide users with access to a secondary smartcard in the event that a primary smartcard has been lost or damaged. Users can create this secondary smartcard by transferring the necessary information over from the primary smartcard. However, in this scenario, transferring information from one trusted device (e.g., a smartcard) to another trusted device (e.g., a backup smartcard) requires the use of an intermediary device (e.g., a smartphone). Because the intermediary device is untrusted and can be a cause for the loss of secret information, there exists a need for a secure transfer process that transfers secret data stored on a trusted storage device to other trusted storage devices via untrusted intermediary device(s).

SUMMARY

To address the shortcomings of the conventional data security, aspects of the disclosure describe methods and systems for transmitting secret information to a trusted device via an untrusted intermediary device.

In some aspects, the techniques described herein relate to a method for transmitting secret information to a trusted device via an untrusted intermediary device, the method including: establishing, by a primary authentication device, a connection with a secondary authentication device via an untrusted intermediary device, wherein the primary authentication device stores secret information to transmit to the secondary authentication device; receiving, from the secondary authentication device via the untrusted intermediary device, a secondary public transfer key, a secondary public device key of the secondary authentication device, a secondary attestation signature generated by signing the primary public transfer key and the secondary public transfer key with a secondary private device key, and a secondary certificate generated by signing the secondary public device key of the secondary authentication device with a private manufacturer key, wherein the private manufacturer key is of a manufacturer of the primary authentication device and the secondary authentication device; verifying, using a public manufacturer key, whether the secondary certificate includes the secondary public device key and, using the secondary public device key, whether the secondary attestation signature confirms the primary public transfer key and the secondary public transfer key; in response to verifying that the secondary certificate includes the secondary public device key and that the secondary attestation signature confirms the primary public transfer key and the secondary public transfer key, calculating a transfer key unique to a transfer of the secret information; encrypting the secret information with the transfer key; and transmitting, to the secondary authentication device via the untrusted intermediary device, the encrypted secret information, wherein the secondary authentication device is configured to decrypt the encrypted secret information.

In some aspects, the techniques described herein relate to a method, wherein the transfer key is generated from a shared symmetric key, a primary private device key, a secondary public device key, and a salt value, wherein establishing the connection includes: generating, using a key derivation function, the shared symmetric key based on a manufacturer key and a shared secret agreed on by the primary authentication device and the secondary authentication device using an Elliptic Curve Diffie-Hellman (ECDH) key agreement protocol on a same elliptic curve.

In some aspects, the techniques described herein relate to a method, wherein the key derivation function is PBKDF2 and the elliptic curve is secp256k1. Other examples include Argon2 as a key derivation function and curve25519 as an elliptic curve.

In some aspects, the techniques described herein relate to a method, calculating the transfer key includes: calculating a shared secret using an Elliptic-curve Diffie-Hellman (ECDH) value of a primary private transfer key and a secondary public transfer key; calculating, using a first key derivation function, a shared symmetric key based on the shared secret and a manufacturer key known to both the primary authentication device and secondary authentication device; and calculating the transfer key using a second key derivation function from the shared symmetric key and a salt value, wherein the salt value is transmitted to the secondary authentication device via the untrusted intermediary device.

In some aspects, the techniques described herein relate to a method, wherein the secondary authentication device is configured to decrypt the encrypted secret information by: calculating shared secret using an Elliptic-curve Diffie-Hellman (ECDH) value of the secondary private transfer key and a primary public transfer key; calculating, using the first key derivation function, the shared symmetric key based on the shared secret and the manufacturer key; calculating the transfer key using the second key derivation function from the shared symmetric key and the salt value received from the primary authentication device; and decrypting the secret information using the transfer key.

In some aspects, the techniques described herein relate to a method, further including: in response to verifying that the secondary certificate does not include the secondary public device key or that the secondary attestation signature does not confirms the secondary public transfer key, determining that a transfer of the secret information is unsecure; and ceasing the transfer of the secret information.

In some aspects, the techniques described herein relate to a method, wherein establishing the connection to the secondary authentication device includes: generating, via the primary authentication device, a primary private transfer key and a primary public transfer key; generating a primary attestation signature by signing the primary public transfer key with a primary private device key of the primary authentication device; and transmitting, via the untrusted intermediary device to the secondary authentication device, a primary certificate of the primary authentication device, wherein the primary certificate is generated by signing a primary public device key of the primary authentication device with a private manufacturer key.

In some aspects, the techniques described herein relate to a method, wherein the secret information configures the secondary authentication device to authorize transactions involving asset transfers to and from a crypto-asset wallet connected to the primary authentication device.

In some aspects, the techniques described herein relate to a method, wherein the primary authentication device can establish connections with multiple secondary authentication devices using one or more untrusted intermediary devices to transmit the secret information.

In some aspects, the techniques described herein relate to a method, wherein the primary authentication device and the secondary authentication device is any combination of: (1) a card including an embedded integrated circuit with memory and a microcontroller, and (2) a wearable device.

In some aspects, the techniques described herein relate to a method, wherein establishing the connection includes detecting the secondary authentication device and the primary authentication device within a threshold distance from the untrusted intermediary device.

It should be noted that the methods described above may be implemented in a system comprising a hardware processor. Alternatively, the methods may be implemented using computer executable instructions of a non-transitory computer readable medium.

In some aspects, the techniques described herein relate to a system for transmitting secret information to a trusted device via an untrusted intermediary device, including: a hardware processor of a primary authentication device, the hardware processor configured to: establish a connection with a secondary authentication device via an untrusted intermediary device, wherein the primary authentication device stores secret information to transmit to the secondary authentication device; receive, from the secondary authentication device via the untrusted intermediary device, a secondary public transfer key, a secondary public device key of the secondary authentication device, a secondary attestation signature generated by signing the primary public transfer key and the secondary public transfer key with a secondary private device key, and a secondary certificate generated by signing the secondary public device key of the secondary authentication device with a private manufacturer key, wherein the private manufacturer key is of a manufacturer of the primary authentication device and the secondary authentication device; verify, using a public manufacturer key, whether the secondary certificate includes the secondary public device key and, using the secondary public device key, whether the secondary attestation signature confirms the primary public transfer key and the secondary public transfer key; in response to verifying that the secondary certificate includes the secondary public device key and that the secondary attestation signature confirms the primary public transfer key and the secondary public transfer key, calculate a transfer key unique to a transfer of the secret information; encrypt the secret information with the transfer key; and transmit, to the secondary authentication device via the untrusted intermediary device, the encrypted secret information, wherein the secondary authentication device is configured to decrypt the encrypted secret information.

In some aspects, the techniques described herein relate to a non-transitory computer readable medium storing thereon computer executable instructions for configuring a backup authentication device, including instructions for: establishing, by a primary authentication device, a connection with a secondary authentication device via an untrusted intermediary device, wherein the primary authentication device stores secret information to transmit to the secondary authentication device; receiving, from the secondary authentication device via the untrusted intermediary device, a secondary public transfer key, a secondary public device key of the secondary authentication device, a secondary attestation signature generated by signing the primary public transfer key and the secondary public transfer key with a secondary private device key, and a secondary certificate generated by signing the secondary public device key of the secondary authentication device with a private manufacturer key, wherein the private manufacturer key is of a manufacturer of the primary authentication device and the secondary authentication device; verifying, using a public manufacturer key, whether the secondary certificate includes the secondary public device key and, using the secondary public device key, whether the secondary attestation signature confirms the primary public transfer key and the secondary public transfer key; in response to verifying that the secondary certificate includes the secondary public device key and that the secondary attestation signature confirms the primary public transfer key and the secondary public transfer key, calculating a transfer key unique to a transfer of the secret information; encrypting the secret information with the transfer key; and transmitting, to the secondary authentication device via the untrusted intermediary device, the encrypted secret information, wherein the secondary authentication device is configured to decrypt the encrypted secret information.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for configuring a backup authentication device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes systems and methods for secure data transmission with prior mutual authentication and encryption between trusted devices that do not have a direct communication channel and communicate through an untrusted intermediary device (e.g., a smartphone).

If trusted devices without their own Internet access need to exchange secret data through an untrusted intermediary device, the confidentiality of data exchange is questionable. Two factors arise that need to be considered to ensure data security: (1) how to protect against data interception by an untrusted intermediary device, and (2) how to verify that the data is being sent to a legitimate recipient. To address these factors, the systems and methods of the present disclosure form a chain of trust between two or more trusted devices. To do this, trusted devices involved in the transfer process (also referred to as backup process) authenticate each other and form a common symmetric encryption key with which the transmitted secret will be encrypted. To form a chain of trust, unique asymmetric key pairs are used for each trusted device, as well as a single key pair for all trusted devices from the trusted devices' manufacturer. The manufacturer's private key, however, is known only to the manufacturer.

Figure 1:
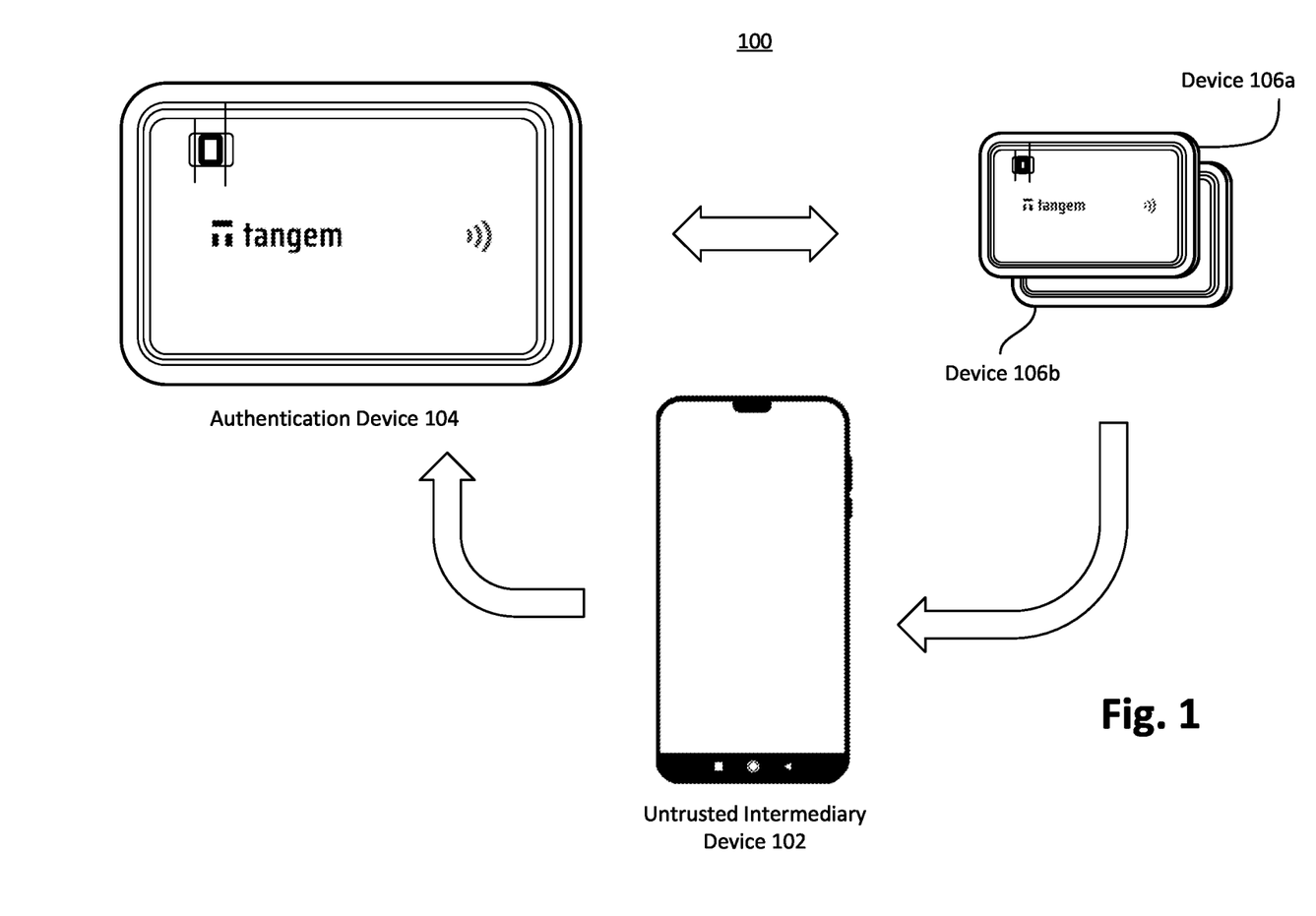
FIG. 1 is a diagram illustrating an authentication device and backup authentication devices.

FIG. 1 is diagram 100 illustrating authentication device 104 and devices 106. In diagram 100, untrusted intermediary device 102 may be any computing device (e.g., smartphone, tablet, etc.) that can wirelessly connect with authenticating device 104, which may be a smart card or a wearable device (e.g., smartwatch). In some aspects, authenticating device 104 may serve as a personal hardware wallet capable to transact both in a traditional payment network (e.g., the Visa network) and in peer-to-peer networks (e.g., blockchains, CBDC ledgers, etc.) without requiring a point-of-sale (POS) upgrade. More specifically, authenticating device 104 cryptographically secures ownership of digital assets and may comprise a contactless interface (e.g., ISO/IEC 14443) that enables interaction with untrusted intermediary device 102 to directly authorize digital currency transactions in a distributed ledger (e.g., a central ledger, a blockchain, etc.)

In one aspect, authenticating device 104 may be a smart card that includes a secure smart-card chip having an ISO/IEC 14443 contactless interface. A smart card is a thin electronic device that is able to perform computing functions. For example, the smart card may be in the form of a thin piece of paper, metal, plastic or cardboard. The size of the card may vary, but is preferably smaller than or equal to the size of a hand of an average person.

In another aspect, authenticating device 104 may be a wearable device. In this case, within the body of authenticating device 104 may be one or more electronic components which include, but are not limited to, a processor, memory, and at least one interface that allows communication with other devices such as a terminal device and untrusted intermediary device 102. Authenticating device 104 may also include an internal power source, e.g., battery, that provides power to the electronic components. Such internal power source may be recharged via electromagnetic waves, e.g., radio waves. In some aspects, authenticating device 104 may not have any internal power source, but may activate or function via electromagnetic waves, e.g., radio waves. In other words, electromagnetic waves may both provide a power source and a means of communication for authenticating device 104.

In some aspects, untrusted intermediary device 102 may provide a user interface (UI) and permit interaction with authenticating device 104 via an iOS- or Android-based application and NFC interface. In some aspects, untrusted intermediary device 102 may perform several functions, including but not limited to obtaining a public key associated with the blockchain wallet from authenticating device 104, verifying that authenticating device 104 possesses the corresponding private key (such as through a challenge-response mechanism), obtaining a blockchain wallet balance via external blockchain nodes, and attesting authenticating device 104. Untrusted intermediary device 102 may utilize a mobile application, such as an iOS- or Android-based application, that performs the aforementioned functions and the like.

In the event that authentication device 104 is lost or damaged, to preserve access to wallet assets associated with authentication device 104, the systems and methods described in the present disclosure are directed to configuring devices 106a and/or 106b using a backup process. As mentioned previously, only two devices 106 that receive information from authentication device 104 are shown in FIG. 1 for simplicity. However, any number of devices 106 can be configured. For example, a user may only want one extra copy, or may want ten copies. Once a backup process has been completed, devices 106 and authentication device 104 are functionally equivalent. Accordingly, devices 106 may be used in the same manner described for authentication device 104 above and in the description of FIGS. 3 and 4.

Figure 2:
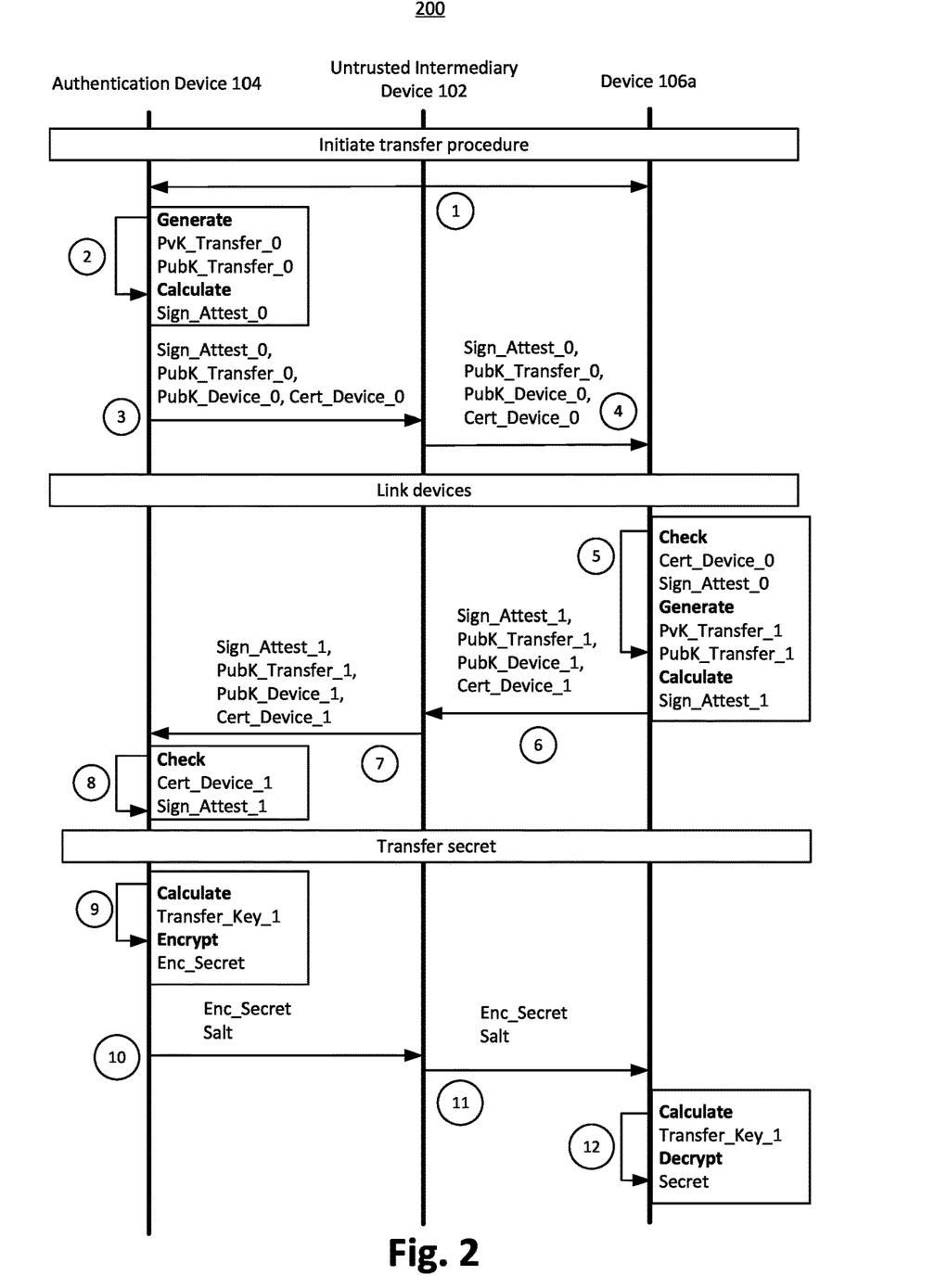
FIG. 2 is a flow diagram illustrating a secure transfer process.

FIG. 2 is a flow diagram illustrating a secure transfer process 200.

In some aspects, secure transfer process 200 includes encryption using the Elliptic Curve Diffie-Hellman (ECDH) key agreement protocol. Each party of the data exchange has its own pair of keys, and using ECDH on the same elliptic curve (e.g., secp256k1, curve25519, etc.), the parties agree on a shared secret. Then, with the help of a key derivation function (e.g., PBKDF2, Argon2, etc.), both sides calculate a shared symmetric key based on the shared secret and a fixed manufacturer's key. After that, for each session of communication with the help of a key derivation function, a session symmetric key is calculated based on the shared symmetric key and a random salt.

For simplicity, only two trusted devices (e.g., authentication device 104 and device 106a) are shown in FIG. 2. However, any number of trusted devices can be set up (e.g., both devices 106a and 106b, etc.).

In some aspects, secure transfer process 200 starts with preparatory work at each trusted device. During this preparatory stage, each trusted device creates and saves a new unique key pair on an elliptic curve including the trusted device's public and private keys PubK_Device and PvK_Device in its flash memory. In addition, each trusted device writes the manufacturer's fixed key Manufacturer_Key and manufacturer's public key PubK_Issuer to the device's flash memory. In some aspects, the manufacturer receives the trusted device's unique public key PubK_Device and signs it with the manufacturer's private key PvK_Issuer. Depending on how the production process is organized, the resulting certificate Cert_Device is written to the trusted device's permanent memory or saved on a remote server.

During operation, there may be a need to transfer the secret stored in authentication device 104 to device 106a. In step 1 of secure transfer process 200, untrusted intermediary device sends a user command to authentication device 104 to initiate a transfer of a stored secret to device 106a. In step 2, authentication device 104, which is the original secret storage, creates a unique agreement key pair on an elliptic curve PvK_Transfer_0 and PubK_Transfer_0. Authentication device 104 signs PubK_Transfer_0 with its unique device private key PvK_Device_0, resulting in the signature Sign_Attest_0. In step 3, authentication device 104 transmits Sign_Attest_0, PubK_Transfer_0, PubK_Device_0 and its certificate Cert_Device_0 to untrusted intermediary device 102, which forwards this information to recipient device 106a in step 4.

In step 5, device 106a reads Cert_Device_0 and Sign_Attest_0 received from authentication device 104. Device 106a then verifies the certificate Cert_Device_0 from authentication device 104 using the manufacturer's pre-shared public key PubK_Issuer. PubK_Transfer_0 is transmitted in plain text, but accompanied by Sign_Attest_0. Device 106a authenticates PubK_Transfer_0 by checking Sign_Attest_0 with PubK_Device_0. If the certificate corresponds to device public key PubK_Device_0, device 106a verifies Sign_Attest_0 using PubK_Device_0 to verify the key PubK_Transfer_0. Device 106a creates a unique agreement key pair on an elliptic curve PvK_Transfer_1 and PubK_Transfer_1. Device 106a signs the keys PubK_Transfer_1 and PubK_Transfer_0 with its unique device private key PvK_Device_1, resulting in the signature Sign_Attest_1. In step 6, device 106a transmits Sign_Attest_1, PubK_Transfer_1, PubK_Device_1 and Cert_Device_1 certificate to untrusted intermediary device 102, which forwards this information to authentication device 104 at step 7.

It should be noted that steps 1-7 may be repeated for all recipient devices involved in the process. For example, if device 106b is to receive the secret information from authentication device 104, steps 1-7 are applied to device 106b as well.

At step 8, authentication device 104 verifies the certificate Cert_Device_1 from device 106a using the manufacturer's pre-shared public key PubK_Issuer. If the certificate corresponds to device public key PubK_Device_1, authentication device 104 verifies Sign_Attest_1 using PubK_Device_1 to verify the key PubK_Transfer_1.

It should be noted that step 8 may be repeated for all recipient devices involved in the process. For example, if device 106b is to receive the secret information from authentication device 104, step 8 is applied to device 106b as well.

In steps 1-8, the devices authenticate each other. This part of the process is necessary to protect against exchanging data with an illegitimate recipient (e.g., a similar device, but with a feature built into it to disclose secret information).

At step 9, authentication device 104 calculates a shared secret using ECDH with PvK_Transfer_0 and PubK_Transfer_1. Then using a key derivation function, authentication device 104 calculates a shared symmetric key based on the shared secret and Manufacturer_Key. Authentication device 104 further calculates a symmetric encryption key Transfer_Key_1 using a key derivation function from the shared symmetric key with a random component (e.g., a salt value), which is transferred along with the secret. In some aspects, the key derivation function may or may not be the same function for calculating the shared symmetric key. In some aspects, HMAC-SHA256 may be used for calculating the shared secret and PBKDF2-SHA256 is used when calculating the TransferKey. The follow are example values of the keys and secrets described above:

PvK_Transfer_0=11BDF4FEFD82EBBF50D68E49984 B053C7785205A7DEB484428F9 F6BBE7383795
PubK_Transfer_0=03C5C2E6B8F85917B97DF7B4460 9210773FBB23B387B7D8766F 8E20882F38D84CE
PvK_Transfer_1=2276E1A01814182A1B7FE53A8EB7 95947C70BF7F9E15FCBF10D6B 861D50EC4FA
PubK_Transfer_1=03355C0F4FACC9C55FDB7E99E3 76E967454AB7B8DC9281EAFB6 2724903BC1F0772
ss: =ECDH (PvK_Transfer_1,PubK_Transfer_0)=ECDH (PvK_Transfer_0,PubK_Transfer_1)=79E7D54- 924A32338167ED54C0DBB635648FEFFE5DE5351 EE7AA9C7CE7035B881
ManufacturerKey=A665A45920422F9D417E4867EF DC4FB8A04A1F3FFF1FA07E998 E86F7F7A27AE3
SharedSecret=HMAC-SHA256(ManufacturerKey, 'BACKUP_KEY'|ss)=A7C6A111BD6CFD1E70EE- 6FF57635011312D242D 65E9C7E48C79BB1EC581- A31FF
salt=81F692A7CFE2CE1D
transferKey=PBKDF2-SHA256(backupKey,salt,50)=D A0- 5CF4F708FBC9F795A934393700829864FE01- 8F796387CDC05A 8DAD611B3C0

Authentication device 104 further encrypts the shared secret with a symmetric encryption algorithm (e.g., AES) with the key Transfer_Key_1, resulting in Enc_Secret. In step 10, authentication device 104 transmits Enc_Secret and the salt value to untrusted intermediary device 102, which forwards Enc_Secret and the salt value to device 106a in step 11. In some aspects, additional information may be added to the secret by authentication device 104, such as a list or a number of recipient devices, hashes, MAC addresses, or a signature to verify the integrity of the secret.

In step 12, device 106a calculates a shared secret using ECDH with PvK_Transfer_1 and PubK_Transfer_0. Then, using a key derivation function, device 106a calculates a shared symmetric key based on the shared secret and Manufacture_Key. Device 106a calculates a unique symmetric encryption key Transfer_Key_1 using a key derivation function from the shared symmetric key with the salt value received from authentication device 104. In particular, device 106a decrypts the received secret Enc_Secret with the Transfer_Key_1 key.

It should be noted that steps 9-12 may be repeated for all recipient devices involved in the process. For example, if device 106b is to receive the secret information from authentication device 104, steps 9-12 are applied to device 106b as well.

In some aspects, if the secret is larger than a specified threshold size, authentication device 104 may split the secret into a plurality of sub-secrets and perform steps 9-12 for each of the sub-secrets. Device 106a may then reconstruct the secret from the plurality of decrypted sub-secrets received via untrusted intermediary device 102.

There are various cases in which the security measures of the present disclosure are useful.

Case 1: Device 106a is spoofed. The malicious device generates and sends PubK_Transfer_1 and Sign_Attest_1 along with PubK_Device_1. Device 104 requests Cert_Device_1, but does not receive it. The device authentication process fails, and device 104 refuses to continue communicating with the malicious device spoofing device 106a.

Case 2: Device 106a is spoofed. The malicious device generates and sends PubK_Transfer_1 and Sign_Attest_1 along with PubK_Device_1 and tampered Cert_Device_1. Device 104 checks tampered Cert_Device_1 with PubK_Issuer and finds that the certificate does not match PubK_Device_1. The device authentication process fails, and device 104 refuses to continue communicating with the malicious device.

Case 3: An attacker interrogates a legitimate device (e.g., by simulating the start of a secret transfer procedure), and implants a PubK_Device_1 key (but not PvK_Device_1, which the legitimate device does not provide to anyone) to the malicious device. The malicious device generates PubK_Transfer_1 and signs it with its PvK_Device_Fake key, receiving Sign_Attest_1. Device 104 receives Cert_Device_1, checks it successfully, then checks Sign_Attest_1—and determines that Sign_Attest_1 does not match the provided PubK_Device_1 and in response Device 104 refuses to continue communicating with the malicious device.

Case 4: An attacker interrogates a legitimate device, and implants the key PubK_Device_1, and the one-time PubK_Transfer_1 and Sign_Attest_1 from the legitimate device to a malicious device. Device 104 receives Cert_Device_1, checks it successfully, and then checks Sign_Attest_1. The whole process succeeds until step 12, when the fake device 106 calculates the shared secret. At this step, the fake device cannot get the correct shared secret because it does not have a PvK_Transfer_1. Consequently, the malicious device will generate an incorrect Transfer_Key_1 and will not be able to decrypt the resulting Enc_Secret.

If the secret cannot be transmitted in a single packet (e.g., because it is too big for the selected transmission protocol), the secret can be transmitted in parts over several communication sessions. To make sure that the full secret is correctly assembled, the integrity of the secret needs to be verified, which can be done with a hash function or a MAC function. In some aspects, a hash function (e.g., SHA256) or MAC (e.g., HMAC-SHA256) may be used to verify the integrity of the transmitted secret.

There are particular advantages to the transfer process described in the present disclosure. Firstly, during the backup process, the secret data cannot be disclosed, as it does not leave the trusted device in a plain text. Even the manufacturer of the device will not be able to decrypt the transferred secret, since the transfer keys remain inside the devices and are not transferred to the outside. Suppose that the secret includes a private key of the user. The process does not disclose a private key of a user at any time. The private key is stored in a secure perimeter and does not leave in an insecure manner.

Another advantage is that a given secret (e.g., a user's private key) created inside one authentication device can be securely copied to N more cards. In the examples given in the present disclosure, N is limited 3 (indicating that only 3 copies exist in space and time), but one skilled in the art will appreciate that N may be any number. A user with all N authentication devices thus has all copies of the private key.

Yet another advantage is that the backup process eliminates the need to write anything down (e.g., a seed phrase) or think about the security of copies. The backup process is smooth and simple, involving just tapping two or more authentication devices to a user device. In fact, the whole process is very simple for the user as it does not require any complex actions other than initiating the data transfer.

Figure 3:
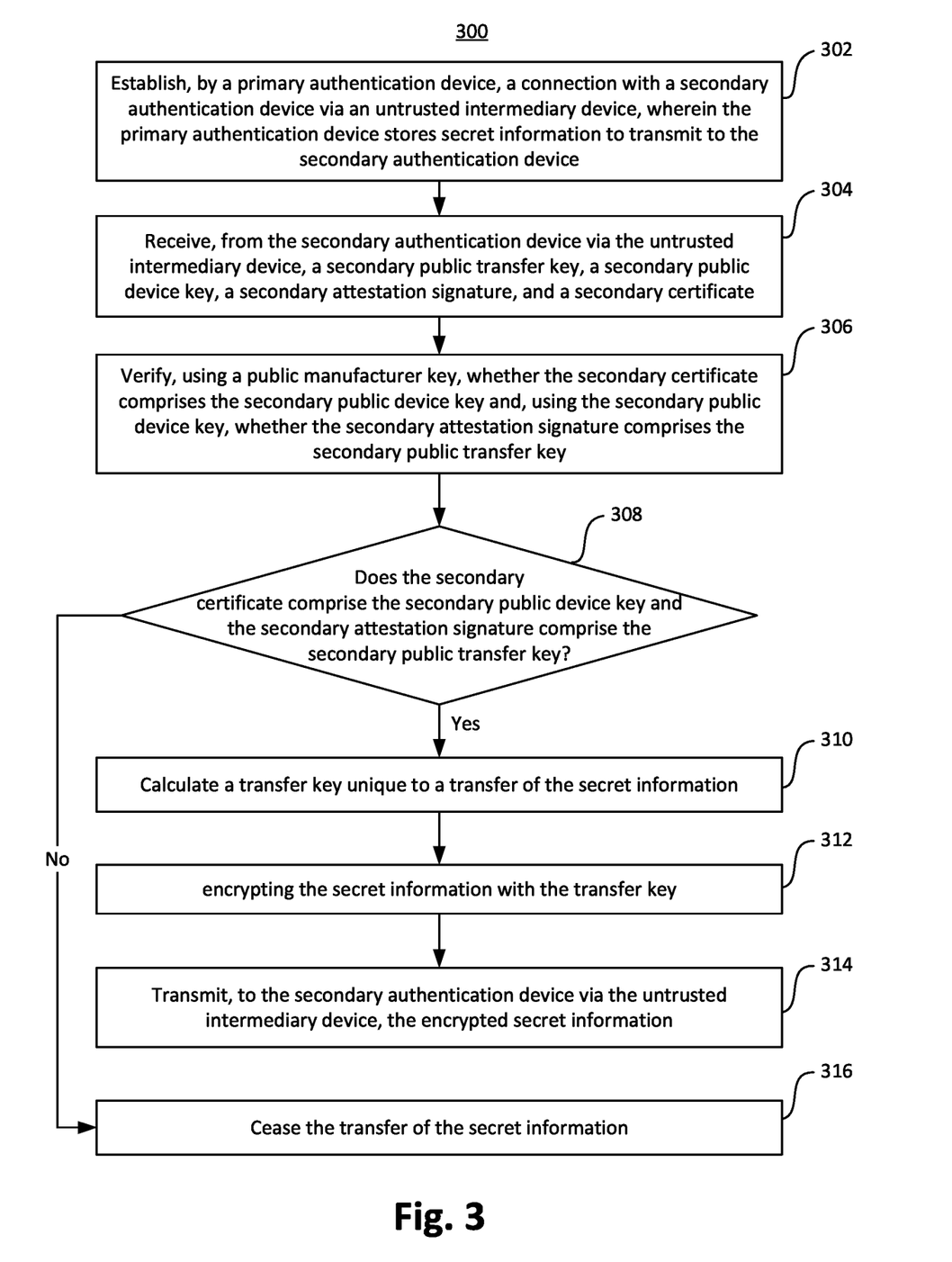
FIG. 3 is a flow diagram illustrating a method for configuring a backup authentication device.

FIG. 3 is a flow diagram illustrating method 300 for configuring a backup authentication device. In reference to FIG. 6, each of untrusted intermediary device 102, backup authentication device 106, and primary authentication device 104 may have client application of a backup software that is used to transmit, receive, synchronize, and process data. Accordingly, when stating that a particular device performs a task, it should be understood that the client application on that particular device performs the task. Furthermore, private keys are reserved and known only to their source/generating device whereas public keys are accessible to other devices.

At 302, primary authentication device 104 establishes a connection with a secondary authentication device 106a via untrusted intermediary device 102, wherein the primary authentication device 104 stores secret information to transmit to the secondary authentication device 106a and/or 106b.

At 304, primary authentication device 104 receives, from the secondary authentication device 106a via the untrusted intermediary device 102, a secondary public transfer key PubK_Transfer_1, a secondary public device key PubK_Device_1 of the secondary authentication device 106a, a secondary attestation signature Sign_Attest_1 generated by signing the primary public transfer key PubK_Transfer_0 and the secondary public transfer key PubK_Transfer_1 with a secondary private device key PvK_Device_1, and a secondary certificate Cert_Device_1 generated by signing the secondary public device key PubK_Device_1 of the secondary authentication device 106a with a private manufacturer key, wherein the private manufacturer key PvK_Issuer is of a manufacturer of the primary authentication device 104 and the secondary authentication device 106a.

At 306, primary authentication device 104 verifies, using a public manufacturer key PubK_Issuer, whether the secondary certificate Cert_Device_1 confirms the secondary public device key PubK_Device_1 and, using the secondary public device key PubK_Device_1, whether the secondary attestation signature Sign_Attest_1 confirms the primary public transfer key PubK_Transfer_0 and the secondary public transfer key PubK_Transfer_1.

At 308, in response to verifying that the secondary certificate Cert_Device_1 confirms the secondary public device key PubK_Device_1 and that the secondary attestation signature Sign_Attest_1 confirms the primary public transfer key PubK_Transfer_0 and the secondary public transfer key PubK_Transfer_1, method 300 advances to 310. However, in response to verifying that the secondary certificate Cert_Device_1 does not comprise the secondary public device key PubK_Device_1 or that the secondary attestation signature Sign_Attest_1 does not comprise the secondary public transfer key PubK_Transfer_1, method 300 advances to 316, where primary authentication device 104 ceases the transfer process of the secret information based on determining that a transfer of the secret information is unsecure.

At 310, primary authentication device 104 calculates a transfer key Transfer_Key_1 unique to a transfer of the secret information.

At 312, primary authentication device 104 encrypts the secret information with the transfer key.

At 314, primary authentication device 104 transmits, to the secondary authentication device 106a via the untrusted intermediary device 102, the encrypted secret information, wherein the secondary authentication device is configured to decrypt the encrypted secret information.

In some aspects, the transfer key is generated from a shared symmetric key and a salt value, wherein establishing the connection confirms generating, using a key derivation function, the shared symmetric key based on a manufacturer key and a shared secret agreed on by the primary authentication device and the secondary authentication device using an Elliptic Curve Diffie-Hellman (ECDH) key agreement protocol on a same elliptic curve. In some aspects, the key derivation function is PBKDF2 and the elliptic curve is secp256k1.

More specifically, in some aspects, calculating the transfer key confirms calculating a shared secret using an Elliptic-curve Diffie-Hellman (ECDH) value of a primary private transfer key PvK_Transfer_0 and a secondary public transfer key PubK_Transfer_1. Primary authentication device 104 calculates, using a first key derivation function, a shared symmetric key based on the shared secret and a manufacturer key Manufacturer_Key known to both the primary authentication device 104 and secondary authentication device 106a, and then calculates the transfer key using a second key derivation function from the shared symmetric key and a salt value, wherein the salt value is transmitted to the secondary authentication device 106a via the untrusted intermediary device 102.

In some aspects, the secondary authentication device 106a is configured to decrypt the encrypted secret information by calculating the shared secret using an Elliptic-curve Diffie-Hellman (ECDH) value of the secondary private transfer key and a primary public transfer key, calculating, using the first key derivation function, the shared symmetric key based on the shared secret and the manufacturer key, calculating the transfer key using the second key derivation function from the shared symmetric key and the salt value received from the primary authentication device, and decrypting the secret information using the transfer key. It should be noted that any of the devices involved use only their own private keys to calculate the shared secret, and the public keys of the other side of the information exchange.

In some aspects, establishing the connection to the secondary authentication device 106a comprises generating, via the primary authentication device 104, a primary private transfer key PvK_Transfer_0 and a primary public transfer key PubK_Transfer_0, generating a primary attestation signature Sign_Attest_0 by signing the primary public transfer key PubK_Transfer_0 with a primary private device key PvK_Device_0 of the primary authentication device 102, and transmitting, via the untrusted intermediary device 102 to the secondary authentication device 106a, a primary certificate Cert_Device_0 of the primary authentication device 104, wherein the primary certificate is generated by signing a primary public device key PubK_Device_0 of the primary authentication device 104 with a private manufacturer key PvK_Issuer.

In some aspects, the secret information configures the secondary authentication device to authorize transactions involving asset transfers to and from a crypto-asset wallet connected to the primary authentication device.

In some aspects, the primary authentication device 104 can establish connections with multiple secondary authentication devices (e.g., 106a, 106b) using one or more untrusted intermediary devices to transmit the secret information.

In some aspects, the primary authentication device and the secondary authentication device is any combination of: (1) a card comprising an embedded integrated circuit with memory and a microcontroller, and (2) a wearable device.

In some aspects, establishing the connection comprises detecting the secondary authentication device 106a and the primary authentication device 104 are within a threshold distance from the untrusted intermediary device 102.

Figure 4:
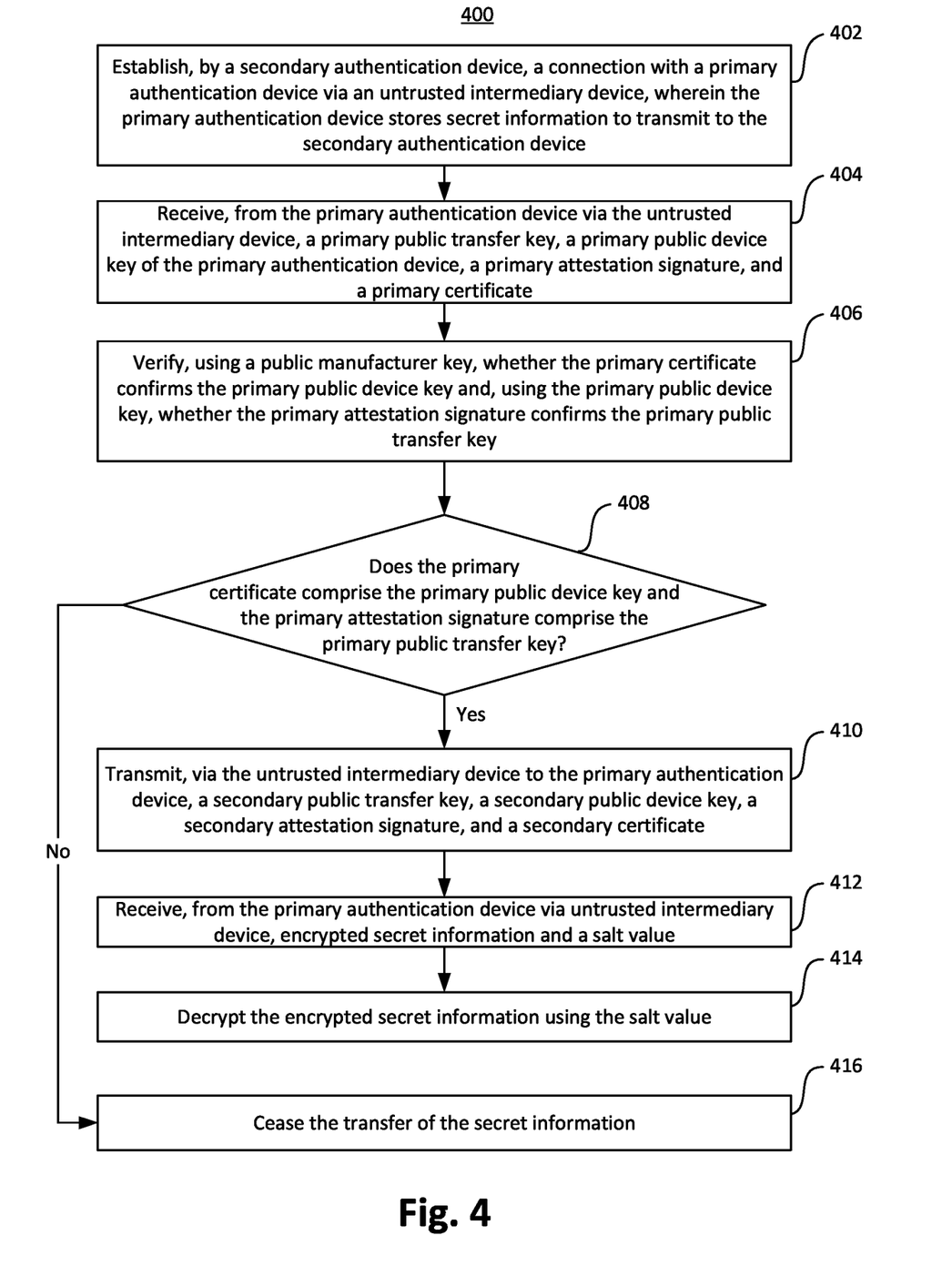
FIG. 4 is a flow diagram illustrating a method for configuring a backup authentication device from the perspective of the backup authentication device.

FIG. 4 is a flow diagram illustrating method 400 for configuring a backup authentication device from the perspective of the backup authentication device.

At 402, establishing, by a secondary authentication device, a connection with a primary authentication device via an untrusted intermediary device, wherein the primary authentication device stores secret information to transmit to the secondary authentication device.

At 404, secondary authentication device receives, from the primary authentication device via the untrusted intermediary device, a primary public transfer key, a primary public device key of the primary authentication device, a primary attestation signature generated by signing the primary public transfer key with a primary private device key, and a primary certificate generated by signing the primary public device key of the primary authentication device with a private manufacturer key, wherein the private manufacturer key is of a manufacturer of the primary authentication device and the secondary authentication device.

At 406, the secondary authentication device verifies, using a public manufacturer key, whether the primary certificate confirms the primary public device key and, using the primary public device key, whether the primary attestation signature confirms the primary public transfer key.

In response to verifying, at 408, that the primary certificate confirms the primary public device key and that the primary attestation signature confirms the primary public transfer key, at 410, transmitting, via the untrusted intermediary device to the primary authentication device, a secondary public transfer key, a secondary public device key of the secondary authentication device, a secondary attestation signature generated by signing the primary public transfer key and the secondary public transfer key with a secondary private device key, and a secondary certificate generated by signing the secondary public device key of the secondary authentication device with a private manufacturer key.

Otherwise, method 400 advances to 416, where the transfer of the secret information is stopped.

At 412, receiving, from the primary authentication device via untrusted intermediary device, encrypted secret information and a salt value.

At 414, decrypting the encrypted secret information using the salt value.

Figure 5:
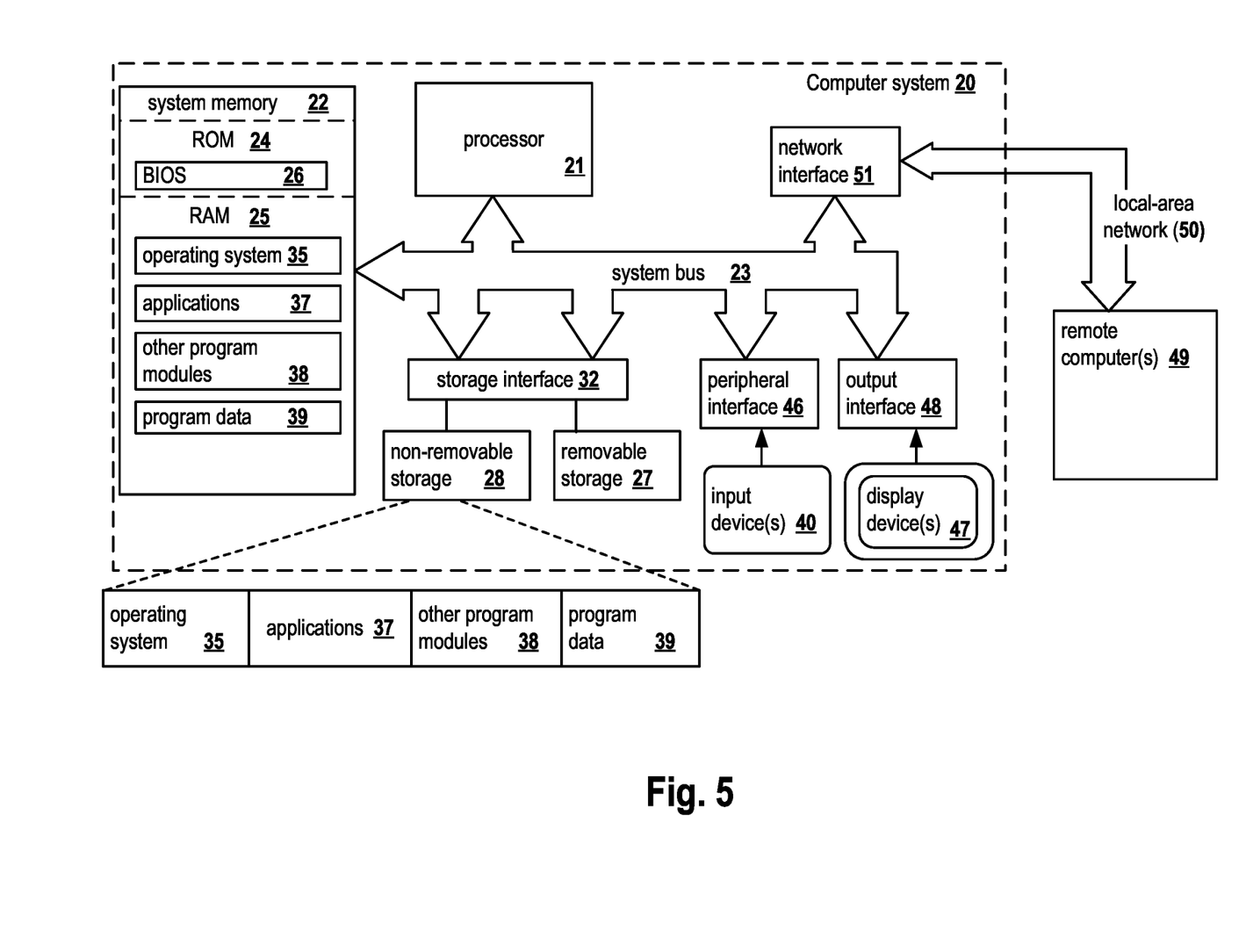
FIG. 5 presents an example of a general-purpose computer system on which aspects of the present disclosure can be implemented.

FIG. 5 is a block diagram illustrating a computer system 20 on which aspects of systems and methods for transaction authorization may be implemented in accordance with an exemplary aspect. Computer system 20 may represent some of the entities described in FIG. 1, such as a terminal device, a user device, or a wearable authentication device. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

Figure 6:
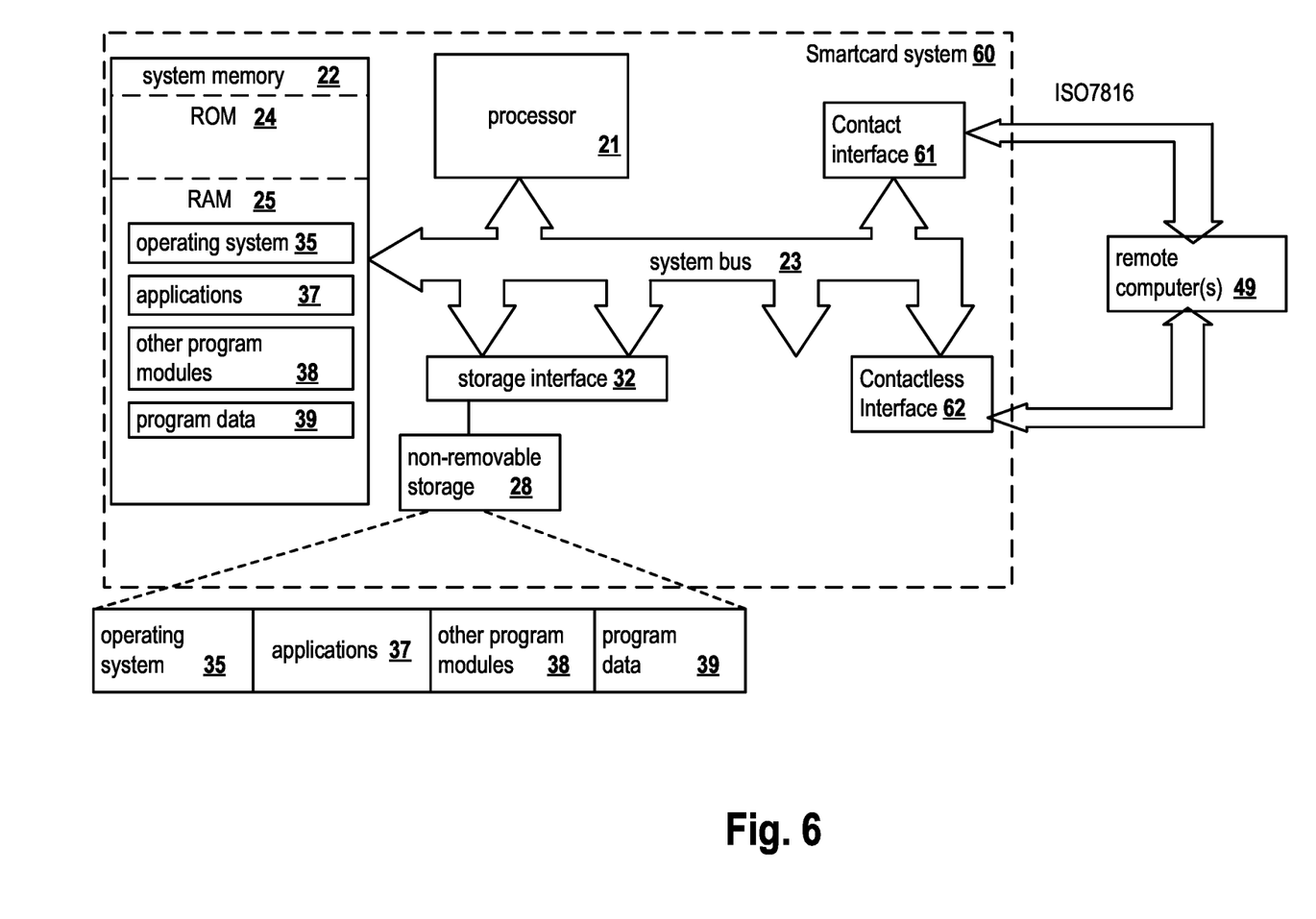
FIG. 6 presents an example of a smartcard system on which aspects of the present disclosure can be implemented.

FIG. 6 presents an example of a smartcard system 60 on which aspects of the present disclosure can be implemented. Smartcard system 60 is a detailed version of authenticating device 104 and backup authentication devices 106 in their payment card form. Smartcard system 60 is a variation of computer system 20 in which several components are removed, including: removable storage 27, peripheral interface 46, input device(s) 40, output interface 48, display device(s) 47, BIOS 26. In their place, smartcard system 60 includes contact interface 61 and contactless interface 62, which communicate with remote computer(s) 49 (e.g., terminal device 310, untrusted intermediary device 102) using, for example, ISO7816.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for transmitting secret information to a trusted device via an untrusted intermediary device, the method comprising:
  establishing, by a primary authentication device, a connection with a secondary authentication device via an untrusted intermediary device, wherein the primary authentication device stores secret information to transmit to the secondary authentication device, wherein the second authentication device does not possess the secret information, wherein the secret information configures the secondary authentication device to authorize transactions involving asset transfers to and from a crypto-asset wallet connected to the primary authentication device;
  receiving, from the secondary authentication device via the untrusted intermediary device, a secondary public transfer key, a secondary public device key of the secondary authentication device, a secondary attestation signature generated by signing a primary public transfer key and the secondary public transfer key with a secondary private device key, and a secondary certificate generated by signing the secondary public device key of the secondary authentication device with a private manufacturer key, wherein the private manufacturer key is of a manufacturer of the primary authentication device and the secondary authentication device;
  verifying, using a public manufacturer key, whether the secondary certificate confirms the secondary public device key and, using the secondary public device key, whether the secondary attestation signature confirms the primary public transfer key and the secondary public transfer key;

in response to verifying that the secondary certificate confirms the secondary public device key and that the secondary attestation signature confirms the primary public transfer key and the secondary public transfer key, calculating a transfer key unique to a transfer of the secret information;

encrypting the secret information with the transfer key; and transmitting, to the secondary authentication device via the untrusted intermediary device, the encrypted secret information, wherein the secondary authentication device is configured to decrypt the encrypted secret information.

2. The method of claim 1, wherein the transfer key is generated from a shared symmetric key and a salt value, wherein establishing the connection comprises:

generating, using a key derivation function, the shared symmetric key based on a manufacturer key and a shared secret agreed on by the primary authentication device and the secondary authentication device using an Elliptic Curve Diffie-Hellman (ECDH) key agreement protocol on a same elliptic curve.

3. The method of claim 2, wherein the key derivation function is one of PBKDF2 and Argon2 and the elliptic curve is one of secp256k1 and curve25519.

4. The method of claim 1, calculating the transfer key comprises:

calculating a shared secret using an Elliptic-curve Diffie-Hellman (ECDH) value of a primary private transfer key and the secondary public transfer key;

calculating, using a first key derivation function, a shared symmetric key based on the shared secret and a manufacturer key known to both the primary authentication device and the secondary authentication device; and calculating the transfer key using a second key derivation function from the shared symmetric key and a salt value, wherein the salt value is transmitted to the secondary authentication device via the untrusted intermediary device.

5. The method of claim 4, wherein the secondary authentication device is configured to decrypt the encrypted secret information by:

calculating the shared secret using an Elliptic-curve Diffie-Hellman (ECDH) value of the secondary private transfer key and the primary public transfer key;

calculating, using the first key derivation function, the shared symmetric key based on the shared secret and the manufacturer key;

calculating the transfer key using the second key derivation function from the shared symmetric key and the salt value received from the primary authentication device; and decrypting the secret information using the transfer key.

6. The method of claim 1, further comprising:

in response to verifying that the secondary certificate does not comprise the secondary public device key or that the secondary attestation signature does not comprise the secondary public transfer key, determining that a transfer of the secret information is unsecure; and ceasing the transfer of the secret information.

7. The method of claim 1, wherein establishing the connection to the secondary authentication device confirms:

generating, via the primary authentication device, a primary private transfer key and the primary public transfer key;

generating a primary attestation signature by signing the primary public transfer key with a primary private device key of the primary authentication device; and transmitting, via the untrusted intermediary device to the secondary authentication device, a primary certificate of the primary authentication device, wherein the primary certificate is generated by signing a primary public device key of the primary authentication device with a private manufacturer key.

8. The method of claim 1, wherein the primary authentication device can establish connections with multiple secondary authentication devices using one or more untrusted intermediary devices to transmit the secret information.

9. The method of claim 1, wherein the primary authentication device and the secondary authentication device is any combination of:

(1) a card comprising an embedded integrated circuit with memory and a microcontroller, and (2) a wearable device.

10. The method of claim 1, wherein establishing the connection confirms detecting the secondary authentication device and the primary authentication device within a threshold distance from the untrusted intermediary device.

11. A system for transmitting secret information to a trusted device via an untrusted intermediary device, comprising:

at least one hardware processor of a primary authentication device, the hardware processor configured to:

establish a connection with a secondary authentication device via an untrusted intermediary device, wherein the primary authentication device stores secret information to transmit to the secondary authentication device, wherein the second authentication device does not possess the secret information, wherein the secret information configures the secondary authentication device to authorize transactions involving asset transfers to and from a crypto-asset wallet connected to the primary authentication device;

receive, from the secondary authentication device via the untrusted intermediary device, a secondary public transfer key, a secondary public device key of the secondary authentication device, a secondary attestation signature generated by signing a primary public transfer key and the secondary public transfer key with a secondary private device key, and a secondary certificate generated by signing the secondary public device key of the secondary authentication device with a private manufacturer key, wherein the private manufacturer key is of a manufacturer of the primary authentication device and the secondary authentication device;

verify, using a public manufacturer key, whether the secondary certificate confirms the secondary public device key and, using the secondary public device key, whether the secondary attestation signature confirms the primary public transfer key and the secondary public transfer key;

in response to verifying that the secondary certificate confirms the secondary public device key and that the secondary attestation signature confirms the primary public transfer key and the secondary public transfer key, calculate a transfer key unique to a transfer of the secret information;

encrypt the secret information with the transfer key; and transmit, to the secondary authentication device via the untrusted intermediary device, the encrypted secret information, wherein the secondary authentication device is configured to decrypt the encrypted secret information.

12. The system of claim 11, wherein the transfer key is generated from a shared symmetric key and a salt value, wherein the at least one hardware processor is configured to establish the connection by:
    generating, using a key derivation function, the shared symmetric key based on a manufacturer key and a shared secret agreed on by the primary authentication device and the secondary authentication device using an Elliptic Curve Diffie-Hellman (ECDH) key agreement protocol on a same elliptic curve.

13. The system of claim 12, wherein the key derivation function is one of PBKDF2 and Argon2 and the elliptic curve is one of secp256k1 and curve25519.

14. The system of claim 11, wherein the at least one hardware processor is configured to calculate the transfer key by:
    calculating a shared secret using an Elliptic-curve Diffie-Hellman (ECDH) value of a primary private transfer key and the secondary public transfer key;
    calculating, using a first key derivation function, a shared symmetric key based on the shared secret and a manufacturer key known to both the primary authentication device and the secondary authentication device; and
    calculating the transfer key using a second key derivation function from the shared symmetric key and a salt value, wherein the salt value is transmitted to the secondary authentication device via the untrusted intermediary device.

15. The system of claim 14, wherein the secondary authentication device is configured to decrypt the encrypted secret information by:
    calculating the shared secret using an Elliptic-curve Diffie-Hellman (ECDH) value of the secondary private transfer key and the primary public transfer key;
    calculating, using the first key derivation function, the shared symmetric key based on the shared secret and the manufacturer key;
    calculating the transfer key using the second key derivation function from the shared symmetric key and the salt value received from the primary authentication device; and
    decrypting the secret information using the transfer key.

16. The system of claim 11, wherein the at least one hardware processor is configured to:
    in response to verifying that the secondary certificate does not comprise the secondary public device key or that the secondary attestation signature does not comprise the secondary public transfer key, determine that a transfer of the secret information is unsecure; and
    cease the transfer of the secret information.

17. The system of claim 11, wherein the at least one hardware processor is configured to establish the connection to the secondary authentication device by:
    generating, via the primary authentication device, a primary private transfer key and the primary public transfer key;
    generating a primary attestation signature by signing the primary public transfer key with a primary private device key of the primary authentication device; and
    transmitting, via the untrusted intermediary device to the secondary authentication device, a primary certificate of the primary authentication device, wherein the primary certificate is generated by signing a primary public device key of the primary authentication device with a private manufacturer key.

18. A non-transitory computer readable medium storing thereon computer executable instructions for configuring a backup authentication device, including instructions for:
    establishing, by a primary authentication device, a connection with a secondary authentication device via an untrusted intermediary device, wherein the primary authentication device stores secret information to transmit to the secondary authentication device, wherein the second authentication device does not possess the secret information, wherein the secret information configures the secondary authentication device to authorize transactions involving asset transfers to and from a crypto-asset wallet connected to the primary authentication device;
    receiving, from the secondary authentication device via the untrusted intermediary device, a secondary public transfer key, a secondary public device key of the secondary authentication device, a secondary attestation signature generated by signing a primary public transfer key and the secondary public transfer key with a secondary private device key, and a secondary certificate generated by signing the secondary public device key of the secondary authentication device with a private manufacturer key, wherein the private manufacturer key is of a manufacturer of the primary authentication device and the secondary authentication device;
    verifying, using a public manufacturer key, whether the secondary certificate confirms the secondary public device key and, using the secondary public device key, whether the secondary attestation signature confirms the primary public transfer key and the secondary public transfer key;
    in response to verifying that the secondary certificate confirms the secondary public device key and that the secondary attestation signature confirms the primary public transfer key and the secondary public transfer key, calculating a transfer key unique to a transfer of the secret information;
    encrypting the secret information with the transfer key; and
    transmitting, to the secondary authentication device via the untrusted intermediary device, the encrypted secret information, wherein the secondary authentication device is configured to decrypt the encrypted secret information.

* * * * *